(12) United States Patent
Kaltenbach et al.

(10) Patent No.: US 8,696,506 B2
(45) Date of Patent: Apr. 15, 2014

(54) DEVICE FOR A DRIVETRAIN OF A HYBRID VEHICLE, DRIVETRAIN AND METHOD FOR OPERATING THE SAME

(71) Applicant: ZF Friedrichshafen AG, Friedrichshafen (DE)

(72) Inventors: Johannes Kaltenbach, Friedrichshafen (DE); Kai Bornträger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/654,457

(22) Filed: Oct. 18, 2012

(65) Prior Publication Data

US 2013/0109524 A1 May 2, 2013

(30) Foreign Application Priority Data

Oct. 26, 2011 (DE) .......................... 10 2011 085 201

(51) Int. Cl.
*F16H 3/72* (2006.01)
(52) U.S. Cl.
USPC .............................................. 475/5; 475/151
(58) Field of Classification Search
USPC .................... 475/5, 151, 153; 477/5; 903/910
See application file for complete search history.

(56) References Cited

U.S. PATENT DOCUMENTS

| 6,805,211 | B2 * | 10/2004 | Fujikawa ................... 180/65.25 |
| 6,805,648 | B1 | 10/2004 | Ehrlinger | |
| 8,075,436 | B2 | 12/2011 | Bachmann | |
| 8,182,391 | B2 * | 5/2012 | Klemen et al. ..................... 477/5 |
| 8,480,525 | B2 * | 7/2013 | Reichert et al. ..................... 475/5 |
| 2008/0125265 | A1 * | 5/2008 | Conlon et al. ..................... 475/5 |
| 2009/0082151 | A1 * | 3/2009 | Tabata et al. ..................... 475/5 |
| 2013/0035188 | A1 * | 2/2013 | Yagasaki ........................... 475/5 |

FOREIGN PATENT DOCUMENTS

DE 199 34 696 A1 5/2001
DE 10 2006 059 591 A1 6/2008

* cited by examiner

*Primary Examiner* — Erin D Bishop
*Assistant Examiner* — Huan Le
(74) *Attorney, Agent, or Firm* — Davis & Bujold, PLLC; Michael J. Bujold

(57) ABSTRACT

A device for a drive train of a hybrid vehicle having a planetary gear set (4) including a ring gear (9), a sun gear (10) and a carrier (8). A first element of these elements of the planetary gear set serves as the connection to a transmission input shaft (11) of a transmission (3) and a second element of these elements of the planetary gear set serves as the connection to an electric machine (2) of a hybrid drive. A clutch (5) and associated shift element (6) by which, in a first shift position (A), a third element of the planetary gear set can be coupled to an internal combustion engine (1) of the hybrid drive while in a second shift position (B), can be coupled to one of the other elements of the planetary gear set (4).

16 Claims, 2 Drawing Sheets

DEVICE FOR A DRIVETRAIN OF A HYBRID VEHICLE, DRIVETRAIN AND METHOD FOR OPERATING THE SAME

This application claims priority from German patent application serial no. 10 2011 085 201.8 filed Oct. 26, 2011.

FIELD OF THE INVENTION

The invention relates to a device for a drive train of a hybrid vehicle, a drive train of a hybrid vehicle and methods for the operation thereof.

BACKGROUND OF THE INVENTION

A drive train of a hybrid vehicle is known from the document DE 199 34 696 A1, the drive train therein comprising an internal combustion engine and an electric machine. The drive train known from the prior art further comprises a transmission which is connected between the drive assembly and an output drive of the drive train, wherein the internal combustion engine, the electric machine and the transmission are coupled together via a device comprising a planetary gear set and a clutch. The planetary gear set comprises a ring gear, a sun gear and a carrier as elements, wherein two of the three elements of the planetary gear set can be coupled via the clutch, which then serves as a lock-up clutch. Such a drive train of a hybrid vehicle is also designated as an electrodynamic drive system.

Using such a drive system, a defined functional scope can be implemented in a drive train of a hybrid vehicle. There is a need however for expanding the functional scope of such a drive train.

SUMMARY OF THE INVENTION

Proceeding from this background, the problem solved by the present invention is to create a novel device for a drive train of a hybrid vehicle and a novel drive train and methods for the operation thereof.

This problem is solved by a device that comprises a shift element via which a third element of these elements of the planetary gear set can be coupled to an internal combustion engine of the hybrid drive in a first shift position and can be coupled to one of the other two elements of the planetary gear set in a second shift position.

With the present invention, an electrodynamic drive system can be expanded in the scope of functions thereof, namely in that the drive train is transferred between different configurations, and thus operation modes, by shifting the shift element between the first shift position and the second shift position.

According to an advantageous further development of the device in the first shift position of the shift element, the planetary gear set serves as a superposition transmission, and the internal combustion engine of the hybrid drive is coupled to the electric machine of the hybrid drive and to the transmission input shaft of the transmission, providing an electrodynamic drive system operating mode, wherein in the second shift position of the shift element, the planetary gear set is bypassed, providing an ISG operating mode, such that all three elements of the planetary gear set have the same rotational speed in block rotation as a whole.

The shift element preferably has a third, neutral shift position in which the third element of the planetary gear set is decoupled, namely both from the internal combustion engine of the hybrid drive and also from the respective element of the two other elements of the planetary gear set. Then, if the shift element in addition to the first shift position and the second shift position, has the third shift position, the electric machine can be quasi-decoupled in order to avoid no-load losses at the electric machine in the event of constant travel, for example.

This problem is further solved by a device that device comprises a shift element by means of which an electric machine of the hybrid drive can be coupled to a third element of the elements of the planetary gear set in a first shift position and can be coupled directly to the transmission input shaft of a transmission in a second shift position.

With this solution as well, an electrodynamic drive system can be expanded in its functional scope, namely in that the drive train is transferred between different configurations, and thus operating modes, by shifting the shift element between the first shift position and the second shift position.

According to an advantageous further development of the device in the first shift position of the shift element, the planetary gear set serves as a superposition transmission and the internal combustion engine of the hybrid drive is coupled to the electric machine of the hybrid drive and to the transmission input shaft of the transmission, providing an electrodynamic drive system operating mode, wherein in the second shift position of the shift element, the planetary gear set runs along idle, or free of torque, providing an ISG operating mode.

Here too, the shift element preferably has a third, neutral shift position in which the electric machine is decoupled, namely both from the third element of the planetary gear set as well as from the transmission input shaft of the transmission. Then, if the shift element in addition to the first shift position and the second shift position, has the third shift position, the electric machine can be completely decoupled in order to prevent no-load losses at the electric machine in the event of constant travel, for example.

BRIEF DESCRIPTION OF THE DRAWINGS

Preferred further developments of the invention will become apparent from the description that follows. Embodiments of the invention are explained in greater detail with reference to the drawing, without being limited thereto. The figures show.

DETAILED DESCRIPTION OF THE PREFERRED EMBODIMENTS

Figure 1:
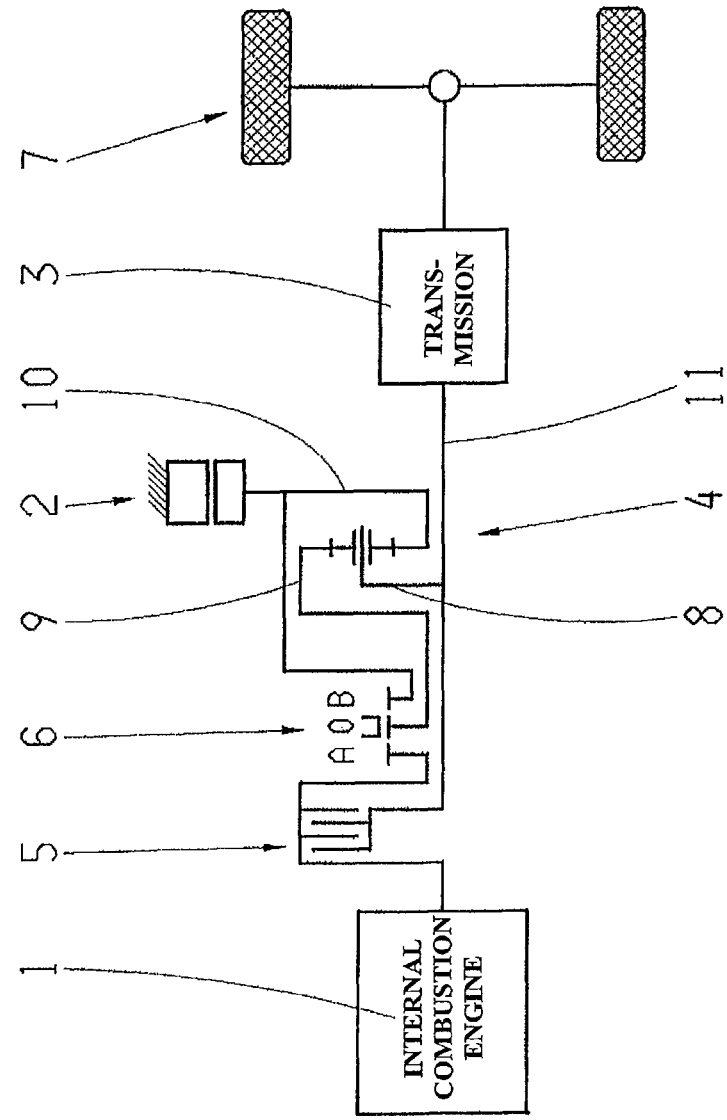
FIG. 1 a diagram of a drive train according to the invention with a device according to the invention according to a first variant of the invention.

FIG. 1 shows a first variant according to the invention of a drive train of a hybrid vehicle together with a device according to the invention for such a drive train, wherein the drive train of FIG. 1 comprises a hybrid drive, or a drive assembly having an internal combustion engine 1 and an electric machine 2, wherein a transmission 3, which is built preferably as an automated, or automatic, transmission, is connected between the hybrid drive, or the drive assembly comprising the internal combustion engine 1 and the electric machine 2, and an output drive 7. A device according to the invention for such a drive train is connected between the drive assembly or the hybrid drive provided by the internal combustion engine 1 and the electric machine 2, and the transmission 3, wherein the device according to the invention comprises at least a planetary gear set 4, a clutch 5 and a shift element 6.

The planetary gear set 4 of the device according to the invention has at least the elements of a carrier 8, ring gear 9 and sun gear 10, wherein a first of these three elements of the planetary gear set 4 in the example embodiment shown in FIG. 1 serves as a fixed connection to a transmission input shaft 11 of the transmission 3. This first element of the planetary gear set 4, which in FIG. 1 serves as the fixed connection to the transmission input shaft 11 of the transmission 3, is in FIG. 1 the carrier 8 of the planetary gear set 4. In the variant of FIG. 1, a second element of the elements of the planetary gear set 4 serves for the fixed connection to the electric machine 2, wherein this second element, which serves for the fixed connection to the electric machine 2 of the hybrid drive, is in FIG. 1 the sun gear 10 of the planetary gear set 4.

Using the shift element 6, a third element of the elements of the planetary gear set 4, in FIG. 1 the ring gear 9 of the planetary gear set 4, can be transferred at least between two shift positions, wherein in a first shift position A the third element of the elements of the planetary gear set 4, in FIG. 1 the ring gear 9, can be coupled to the internal combustion engine 1 of the hybrid drive, and wherein in a second shift position B the third element of the planetary gear set 4, in FIG. 1 the ring gear 9, can be coupled to one of the two other elements of the planetary gear set 4, namely in FIG. 1 to the sun gear 10.

The clutch 5 according to FIG. 1 is coupled between the internal combustion engine 1 and the transmission input shaft 11.

In the first shift position A of the shift element 6, the planetary gear set 4 serves as a superposition transmission, wherein in the shift position A of the shift element 6, the internal combustion engine 1 and the electric machine 2 are coupled to the transmission input shaft 11 of the transmission 3, providing an electrodynamic drive system configuration or an electrodynamic drive system operating mode, wherein the electrodynamic drive system operating mode is also designated as an operating mode of an electrodynamic drive system.

In the second shift position B of the shift element 6, the planetary gear set 4 is bypassed, providing an ISG configuration or an ISG operating mode which is also designated as an operating mode of an integrated starter generator, namely such that in the second shift position B of the shift element 6 the planetary gear set 4 is in the state of block rotation as a whole, wherein then all three elements of the planetary gear set 4, that is, carrier 8, ring gear 9 and sun gear 10 have the same rotational speed.

Accordingly, by shifting the shift element 6 between the shift position A and the second shift position B, the drive train of FIG. 1 can be transferred between an electrodynamic drive system configuration in the shift position A and an ISG configuration in the shift position B.

It is pointed out here that the connection of the internal combustion engine 1, electric machine 2 and the transmission input shaft 11 to the three elements of the planetary gear set 4 can also differ from the preferred variant shown in FIG. 1. Thus, in contrast to FIG. 1, it is possible to connect the internal combustion engine 1 to the sun gear and the electric machine 2 to the ring gear. Furthermore, in contrast to the minus planetary gear set shown in FIG. 1, a plus planetary gear set can also be used, wherein then the electric machine is preferably connected to the sun gear, the transmission input shaft is preferably connected to the ring gear and the carrier can be shifted by means of a shift element, between the internal combustion engine and another element of the planetary gear set.

In the preferred variant of FIG. 1, the shift element 6 in addition to the first shift position A for providing the electrodynamic drive system operating mode and the second shift position B for providing the ISG operating mode comprises a third, neutral shift position O, in which the third element of the planetary gear set 4, the ring gear 9 in FIG. 1, is free-running, thus coupled neither to the internal combustion engine 1 nor to another element of the planetary gear set 4. In the shift position O, the electric machine 2 is braked to a standstill by a so-called cogging torque of the electric machine. In the shift position O of the shift element 6, there are no zero-load losses at the electric machine 2 which would arise in the case of a rotating rotor of the electric machine 2. Accordingly, in the case of long periods of constant travel with low demand for electrical energy, the electric machine 2 can be quasi-decoupled from the drive train in the third, neutral shift position O. In the third shift position O, the drive train of FIG. 1 behaves in the manner of a conventional, internal combustion engine drive train. No hybrid functions are possible then.

The third shift position O of the shift element 6 is also suitable for an emergency operation of the motor vehicle. In particular, electric machines designed as synchronous machines at very low rotational speeds in so-called active short-circuit state have high torque, whereby startup is not possible with inactive rotating field control. In the third shift position O of the shift element 6, it can be guaranteed that the electric machine 2 does not act as a brake on the transmission input shaft 11, and thus the entire torque of the internal combustion engine 1 can be transferred to the transmission input shaft 11.

In the first shift position A in FIG. 1, the ring gear 9 of the planetary gear set 4 is connected to the internal combustion engine 1. The electric machine 2 supports torque at the sun gear 10, and a sum of the torque provided by the internal combustion engine 1 and the electric machine 2, is provided as drive torque at the transmission input shaft 11, so that accordingly in the first shift position A, the planetary gear set 4 acts as a superposition transmission, and the functionality of an electrodynamic drive system operating mode or the functionality of an electrodynamic drive system is available in the first shift position A.

The clutch 5, which is connected between the internal combustion engine 1 and the transmission input shaft 11, acts as a lock-up clutch of the planetary gear set 4. An electrodynamic drive system operating mode can be ended by engaging the clutch 5. In the electrodynamic drive system operating mode, a torque desired by the driver is applied via torque distribution between the internal combustion engine 1 and the electric machine 2.

In the second shift position B of the shift element 6, an ISG operating mode can be provided, wherein the planetary gear set 4 is bypassed in shift position B. The electric machine 2 is then coupled, without transmission ratio from the planetary gear set 4, to the transmission input shaft 11. In this second shift position B, or in the ISG operating mode, or integrated starter generator operating mode, purely electric driving with a simply transmitted electric machine 2 is possible.

When the driving speed of the drive train is less than a limit value, or the vehicle is at zero speed in standstill, the shift element 6 takes on the second shift position B if a charge state of an electric energy store, not shown in FIG. 1, acting together with the electric machine 2 of the hybrid drive, is greater than a limit value. This limit value for the charge state of the electric energy store is selected such that a purely electric startup is possible from standstill of the hybrid vehicle. Otherwise, the shift element 6 takes on the first shift position A, in order to be able to start, free of wear, even with a nearly empty electric energy store, namely in the electrodynamic drive system operating mode.

Furthermore, the shift element 6 takes on the shift position B, and accordingly the ISG operating mode for recovery, thus during regenerative braking using the electric machine 2, so that the internal combustion engine 1 can be decoupled using the clutch 5 and switched off.

The shift element 6 preferably takes on the third, neutral shift position O during constant travel with a constant travel speed, in which little generator-produced electrical energy is required in order to avoid no-load losses at the electric machine 2 in the third, neutral shift position O of the shift element 6.

Furthermore, the shift element 6 can take on the third shift position O if an error is present in the electrical system relating to the electric machine 2, in order to make emergency operation of the drive train possible, thus a conventional drive operation using the internal combustion engine 1, with the electric machine 2 at standstill for example.

Furthermore, the invention relates to methods for operating such a drive train, or such a device for a drive train, wherein the methods according to the invention are described in the following in detail.

A first method according to the invention relates to shifting for the shift element 6 from the first shift position A into the second shift position B, and accordingly a change from the electrodynamic drive system operating mode into the ISG operating mode, with an initially disengaged clutch 5. In the starting state for this method the shift element 6 is accordingly engaged in shift position A and the clutch 5 is disengaged, wherein the electrodynamic drive system can be started in this electrodynamic drive system operating mode, until the planetary gear set 4 is in block rotation as a whole and accordingly the three elements 8, 9, 10 of the planetary gear set 4 have equal rotational speed. The clutch 5 is then synchronously engaged, wherein subsequently load is reduced at the electric machine 2, wherein the electric machine 2 is preferably made completely load-free and the load thereof is transferred to the greatest extent possible to the internal combustion engine 1. Hereby, the shift element 6 with respect to shift position A becomes load-free such that the first shift position A can be disengaged load-free, wherein then the shift element 6 takes on the neutral shift position O. Then, the shift element 6 is synchronized with respect to the second shift position B in a speed-regulated operation of the electric machine 2. When the clutch 5 is engaged, the shift element 6 is already synchronized with respect to shift position B. In shift position B of the shift element 6 however, there can be a tooth-on-tooth position, wherein such a tooth-on-tooth position can be resolved by appropriately modifying the rotational speed of the electric machine 2. In the synchronized state of shift position B, this shift position can be engaged load-free. Then, load preferably builds up at the electric machine 2, in the generator operation thereof, for example. This method according to the invention has the advantage that there is no interruption of tractive force at the output drive 7, because the internal combustion engine 1, with an engaged clutch 5, can provide torque at the transmission input shaft 11.

Shifting the shift element 6 from the shift position A into the shift position B with an initially disengaged clutch 5 without interrupting the tractive force is necessary if a transition from electrodynamic drive system creep mode into a purely electrical creeping is to occur without interruption of tractive force. This can occur for example in generator operation of the electric machine 2, when creeping occurs over a long period using the electrodynamic drive system, and the electric energy store, not shown in FIG. 1, is too full with respect to the charge state thereof. During electrical creeping in shift position B, creeping subsequently occurs with the electric machine 2 operating as a motor, such that then the electric energy store, not shown in FIG. 1, is more strongly discharged by the electric machine 2. In order to perform such a change, in the starting state, the shift element 6 is engaged in shift position A, the clutch 5 is disengaged and the internal combustion engine 1 is running. Then, load is transferred from the electric machine 2 to the clutch 5, that is, the internal combustion engine 1 completely provides the drive torque via the clutch 5. For this purpose, the clutch 5 is operated with slip at relatively low travel speeds. After there is no longer any torque at the electric machine 2, the shift element 6 is load-free with respect to shift position A, so that subsequently the first shift position A can be disengaged load-free, in that the shift element 6 is transferred into the third shift position O. Then in a speed-regulated operation of the electric machine 2, the shift element 6 is synchronized with respect to the second shift position B, and subsequently the second shift position B is synchronously engaged. Then, load is transferred from the internal combustion engine 1 to the electric machine 2, that is, load develops at the electric machine 2 and load is removed from the internal combustion engine 1. The clutch 5 becomes load-free due to the removal of load at the internal combustion engine 1, such that the clutch 5 is subsequently disengaged preferably load-free. Then, purely electrical creeping occurs, wherein the internal combustion engine 1 runs idle or can be switched off.

A further method according to the invention relates to shifting the shift element 6 from shift position B into shift position A with clutch 5 disengaged, wherein in this case in the starting state the second shift position B of the shift element 6 is engaged and the clutch 5 is disengaged. Originating from this starting state of the ISG operating mode, in order to change into the EDA operating mode, the electric machine 2 is subsequently made load-free if possible, namely by interrupting the tractive force wherein subsequently the shift element 6 is disengaged from shift position B and is transferred into the third shift position O. Then, in speed-regulated operation of the electric machine 2, the shift element 6 is synchronized with respect to shift position A, for example to an idle rotational speed of the internal combustion engine 1, wherein subsequently the shift position A is engaged load-free and then subsequently operation in the electrodynamic drive system operating mode is possible.

The invention further relates to a change of the shift element 6 from the shift position B into the shift position A with an initially engaged clutch 5, wherein in this starting state, thus in ISG mode, the clutch 5 is engaged and the shift element 6 is engaged in the second position B. Originating from this starting state, initially the electric machine 2 is preferably made completely load-fee, and the load thereof is transferred to the greatest extent possible to the internal combustion engine 1, in order to make the shift position B of the shift element 6 load-free, and in this load-free state, to engage the shift position B of the shift element 6. Here, the shift element 6 is transferred into the third, or neutral, shift position O, wherein subsequently, in speed-regulated operation of the electric machine 2, the shift element 6 is synchronized with respect to the first shift position A, namely to the actual rotational speed of the internal combustion engine 1. Should the clutch 5 be engaged, then the shift position A is already synchronous. A tooth-on-tooth position at shift position A can be resolved by changing the rotational speed of the electric machine 2. Following that, the shift position A is engaged without load. The load of the internal combustion engine 1 can be supported using the electric machine 2, so that the clutch 5 is without load. The ratio of the torque, provided by the internal combustion engine 1 and the electric machine 2, required for this purpose is determined by the stationary transmission ratio of the planetary gear set 4. If necessary, load can be removed from the internal combustion engine 1 so that the appropriately reduced torque of the internal combustion engine 1 can be supported by the electric machine 2. In the load-free state of the clutch 5, this clutch can be disengaged load-free, wherein subsequently operation occurs in the electrodynamic drive system mode.

The invention further relates to a shifting method for shifting from the second shift position B into the first shift position A with an initially disengaged clutch 5 without an interruption of tractive force, in order to guarantee shifting from a purely electric ISG creep mode into the electrodynamic drive system creep mode without an interruption of tractive force, for example. This can be necessary when creeping electrically occurs for a long time in ISG operating mode and the electric energy store, not shown, is too strongly discharged. In this case, a switch into the electrodynamic drive system operating mode must occur, in order to subsequently creep in the generator mode of the electric machine 2 and thus to again more strongly charge the electric energy store, not shown. Here, in the starting state of the ISG operating mode, the shift position B of the shift element 6 is engaged, the clutch 5 is disengaged and the internal combustion engine 1 runs. Subsequently, load is transferred from the electric machine 2 to the clutch 5, wherein the internal combustion engine 1, via the clutch 5, preferably completely provides the drive torque, and wherein for this purpose, the clutch 5 is operated with slip at relatively low travel speeds. Torque is completely reduced at the electric machine 2, wherein hereby, the shift element 6 becomes load-free with respect to the second shift position B, such that the shift position B is disengaged load-free and that the shift element 6 can be transferred into the third shift position O. Next, the shift element 6 is synchronized with respect to the shift position A via a speed-regulated operation of the electric machine 2, wherein subsequently the first shift position A is engaged load-free. Then, load builds up at the electric machine 2, namely such that the clutch 5 becomes load-free. For this purpose, the electric machine 2 supports the torque of the internal combustion engine 1 such that torque is no longer transmitted via the clutch 5. The torque of the internal combustion engine 1 is reduced as a result so that torque at the transmission input shaft 11 does not unintentionally become excessive. Then, the clutch 5 is disengaged, and electrodynamic drive system operation is possible.

The description above assumes that the shift element 5 is a frictionally engaging clutch. In contrast, it is also possible that the clutch 5 is designed as a form-locking clutch, for example as an unsynchronized dog clutch. This can be advantageous for reasons of construction space and cost. If the clutch 5 is designed as a form-locking clutch, most of the functions described above can be implemented with the exception of those functions in which it is necessary for the clutch 5 to slip. If necessary, for this purpose, a shift element of the transmission 3 can be operated with slip.

Figure 2:
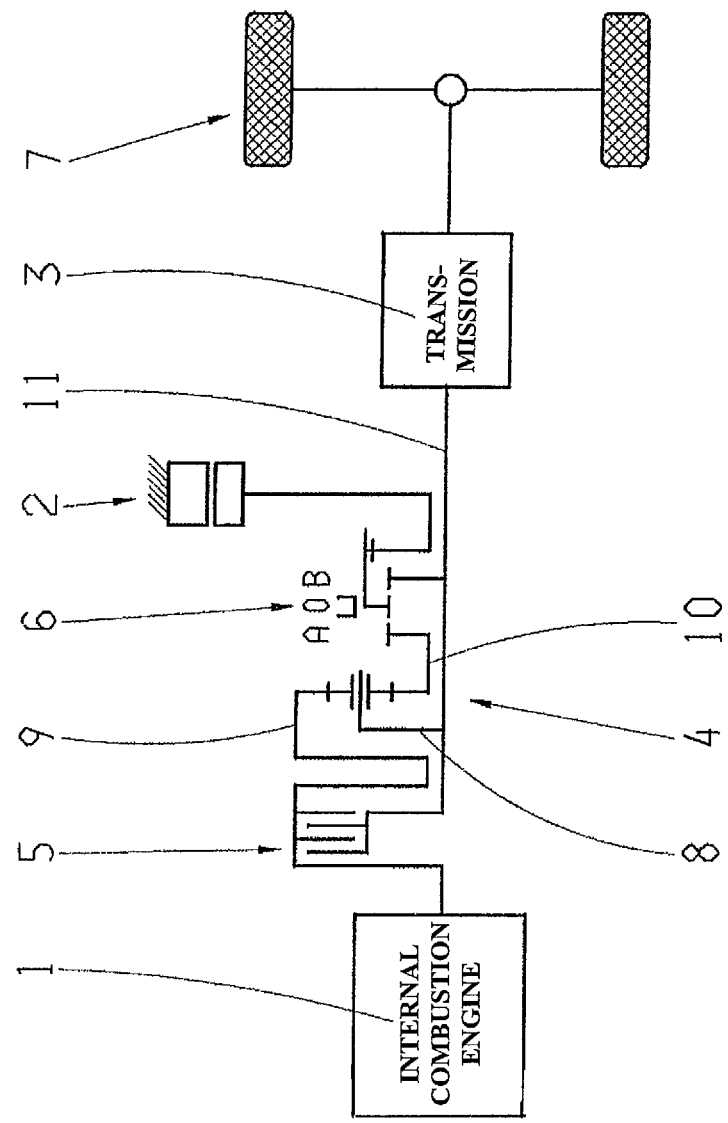
FIG. 2 a diagram of a drive train according to the invention with a device according to the invention according to a second variant of the invention.

FIG. 2 shows a second variant of the invention. In FIG. 2, a first element of the planetary gear set 4 again serves for the fixed connection to the transmission input shaft 11, wherein in FIG. 2, this first element of the planetary gear set 4, which serves for the fixed connection to the transmission input shaft 11, again is the carrier 8 of the planetary gear set 4. In the variant of FIG. 2, a second element of the elements of the planetary gear set 4 serves for the fixed connection to the internal combustion engine 1, wherein this second element in FIG. 2 is the ring gear 9 of the planetary gear set 4. In the variant of FIG. 2, the electric machine 2 can be shifted using the shift element 6, namely at least between the first shift position A, in which the electric machine 2 is coupled to a third element of the planetary gear set 4, in FIG. 2 to the sun gear 10, and wherein in the second shift position B of the shift element 6, the electric machine 2 is coupled directly to the transmission input shaft 11 of the transmission 3, thus without a transmission ratio.

In the variant of FIG. 2 as well, the first shift position A of the shift element 6 also serves to provide an electrodynamic drive system configuration, or an electrodynamic drive system operating mode for the drive train shown. The second shift position B serves again to provide an ISG operating mode, or an ISG configuration, wherein in FIG. 2 in the shift position B the planetary gear set 4 runs idle or free of torque, namely with clutch 5 disengaged. In the variant of FIG. 2, the electric machine 2 can be shifted between the sun gear 10 of the planetary gear set 4 and the transmission input shaft 11, wherein the transmission input shaft 11 is in a fixed coupling to the carrier 8, and the internal combustion engine 1 is in a fixed coupling to the ring gear 9 of the planetary gear set 4.

This connection can also differ, thus for example, the internal combustion engine 1 can engage at the sun gear and the electric machine 2 can engage at the ring gear of the planetary gear set 4. Likewise it is also possible in FIG. 2, instead of the minus planetary gear set shown, to use a plus planetary gear set, wherein then in the first shift position A the electric machine 2 is preferably connected to the sun gear, the transmission input shaft 11 is preferably connected to the ring gear, and the internal combustion engine 1 is preferably connected to the carrier of the planetary gear set.

In the variant of FIG. 2, the same methods can be used as for the variant of FIG. 1, so that for avoiding unnecessary repetition, reference is made to the explanations for FIG. 1.

REFERENCE CHARACTERS

1 internal combustion engine
2 electric machine
3 transmission
4 planetary gear set
5 clutch
6 shift element
7 output drive
8 carrier
9 ring gear
10 sun gear
11 transmission input shaft

The invention claimed is:

1. A device for a drive train of a hybrid vehicle, the device comprising:
   a planetary gear set (4) comprising first, second and third elements, the first, the second and the third elements of the planetary gear set being a carrier (8), a sun gear (10) and a ring gear (9), respectively,
   the first element of the planetary gear set serving as a connection to a transmission input shaft (11) of the transmission (3),
   the second element of the planetary gear set serving as a connection to an electric machine (2) of a hybrid drive and comprising a clutch (5), and a shift element (6)
- which, in a first shift position (A), releasably connecting the third element of the planetary gearset to an internal combustion engine (1) of the hybrid drive, and
- which, in a second shift position (B), releasably connecting the third element of the planetary gearset to one of the first and the second elements of the planetary gearset (4).

2. The device according to claim 1, wherein in the first shift position (A) of the shift element (6), the planetary gear set (4) serves as a superposition transmission, and the internal combustion engine (1) of the hybrid drive is coupled to the electric machine (2) of the hybrid drive and to the transmission input shaft (11) of the transmission (3), providing an electrodynamic drive system operating mode, and in the second shift position (B) of the shift element (6), the planetary gear set (4) is bypassed, providing an ISG operating mode, such that all of the three elements (8, 9, 10) are in block rotation as a whole and have the same rotational speed.

3. The device according to claim 1, wherein, in the first shift position (A), the shift element releasably connects the third element of the planetary gearset to a shaft bearing the clutch (5).

4. A device for a drive train of a hybrid vehicle, having a planetary gear set (4) comprising three elements, the three elements of the planetary gear set being a ring gear (9), a sun gear (10) and a carrier (8), a first element of the three elements (8, 9, 10) of the planetary gear set is fixedly a coupled to a transmission input shaft (11) of a transmission (3), and a second element of the three elements (8, 9, 10) of the planetary gear set is fixedly coupled to an internal combustion engine (1) of a hybrid drive, and having a clutch (5), a shift element (6) by which, in a first shift position (A), an electric machine (2) of the hybrid drive is connected to a third element of the three elements (8, 9, 10) of the planetary gear set, and, in a second shift position (B), is connectable to the transmission input shaft (11) of the transmission (3).

5. The device according to claim 4, wherein in the first shift position (A) of the shift element (6), the planetary gear set (4) serves as a superposition transmission and the internal combustion engine (1) of the hybrid drive is coupled to the electric machine (2) of the hybrid drive and to the transmission input shaft (11) of the transmission (3), providing an electrodynamic drive system operating mode, and in the second shift position (B) of the shift element (6), the planetary gear set (4) either runs idle, or without torque, providing an ISG operating mode.

6. The device according to claim 1, wherein the clutch (5) is connected between the transmission input shaft (11) and the internal combustion engine (1) of the hybrid drive.

7. The device according to claim 1, wherein, if a a travel speed is either less than a limit value or is zero and if furthermore a charge state of an electric energy store working together with the electric machine (2) of the hybrid drive is greater than a limit value, the shift element (6) takes the second o shift position (B).

8. The device according to claim 1, wherein the shift element (6) takes the second shift position (B) for recovery.

9. The device according to claim 1, wherein the shift element (6) has a third, neutral shift position (O) in which the third element is decoupled from the electric machine (2) of the hybrid drive.

10. The device according to claim 9, wherein if a travel speed is approximately constant, the shift element (6) takes the third shift a position (O).

11. A drive train of a hybrid vehicle in combination with device having a planetary gear set (4) comprising first, second and third elements, the third, the second and the first elements of the planetary gear set a comprising a ring gear (9), a sun gear (10) and a carrier (8),
- the first element of the planetary gear set serving as a connection to a transmission input shaft (11) of a transmission (3) and being fixedly attached to a clutch a (5),
- the second element of the planetary gear set serving as a connection to an electric machine (2) of a hybrid drive,
- the clutch (5) and a shift element (6) by which, in a first shift position (A) of the shift element (6), the third element of the planetary gearset being connected to an internal combustion engine (1) of the hybrid drive, and, in a second shift position (B) of the shift element (6), is connected to one of the first and the second elements of the planetary gearset (4).

12. A method of operating a device for a drive train of a hybrid vehicle, having a planetary gear set (4) comprising first, second and third elements, the third, the second and the first elements of the planetary gear set comprising a ring gear (9), a sun gear (10) and a carrier (8), the first element of the planetary gear set being fixedly attached to a clutch (5) and serving as a connection to a transmission input shaft (11) of the transmission (3), the second element of the planetary gear set serving as a connection to an electric machine (2) of a hybrid drive, the clutch (5) and a shift element (6) by which, in a first shift position o (A) of the shift element (6), the third element of the planetary gearset is connected to an internal combustion engine (1) of the hybrid drive, and, in a second shift position (B) of the shift element (6), being connected to one of the first and the second elements of the planetary gearset (4), the method comprising the steps of:
- synchronously engaging the clutch (5), when the clutch is initially disengaged, for shifting the shift element (6) from the first shift position (A) to the second shift position (B);
- making the electric machine (2) load-free so that the load thereof is either completely or partially transferred to the internal combustion engine (1);
- disengaging the first shift position (A), then using the electric machine (2), in a speed-regulated mode, and synchronizing the shift element (6) with respect to the second shift position (B); and
- engaging the second shift position (B).

13. The method for operating a device according to claim 12, further comprising the step of
- completely making the electric machine (2) load-free for shifting the shift element (6) from the second shift position (B) to the first shift position (A) with a disengaged clutch (5);
- disengaging the second shift position (B);
- using the electric machine (2), in the speed-regulated mode, and synchronizing the shift element (6) with respect to the first shift position (A); and
- engaging the first shift position (A).

14. The method for operating a device according to claim 12, further comprising the step of
- making the electric machine (2) load-free for shifting the shift element (6) from the second shift position (B) into the first shift position (A) with an initially engaged clutch (5);
- at least partially transferring the load of the electric machine (2) to the internal combustion engine (1), and subsequently disengaging the second shift position (B);
- synchronizing the shift element (6) with respect to the first shift position (A) using the electric machine (2) in a speed-regulated mode; and
- engaging the first shift position (A).

15. The method for operating a device according to claim 12, further comprising the step of shifting the shift element (6) from the first shift position (A) into the second shift position (B) without interrupting the tractive force with an initially disengaged clutch (5) by at least partially transferring load provided by the electric machine (2) to the internal combustion engine (1) via the clutch (5), operated with slip, then disengaging the first shift position (A), then using the electric machine (2) in a speed-regulated mode thereof, synchronizing the shift element (6) with respect to the second shift position (B), and subsequently engaging the second shift position (B), and subsequently developing load at the electric machine (2) and decreasing load at the internal combustion engine (1), in order to subsequently disengage the clutch (5) preferably load-free.

16. The method for operating a device according to claim 12, further comprising the step of shifting the shift element (6) from the second shift position (B) into the first shift position (A) without interrupting the tractive force with the clutch initially disengaged and the internal combustion engine (1) running by reducing load at the electric machine (2), and by at least partially engaging the clutch (5), via the clutch the torque of the internal combustion engine (1) is transferred, then disengaging the second shift position (B), then using the electric machine (2) in a speed-regulated mode thereof, synchronizing the shift element (6) with respect to the first shift position (A), and subsequently engaging the first shift position (A), and subsequently developing load at the electric machine (2) and decreasing load at the internal combustion engine (1), in order to subsequently disengage the clutch (5) preferably load-free.

\* \* \* \* \*